Oct. 6, 1959    R. M. R. G. LOUIS ET AL    2,907,052
RECEPTACLES
Filed July 11, 1957    4 Sheets-Sheet 1

RAYMOND M.R.G. LOUIS
PIERRE CHARLES FOATELLI
INVENTOR

ATTORNEY

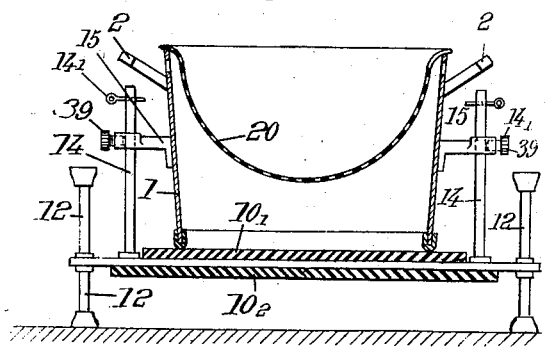
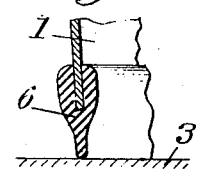
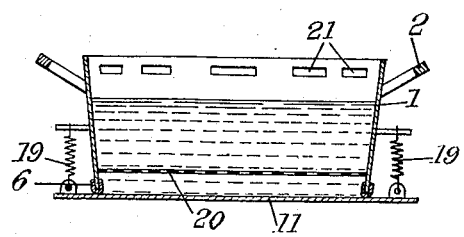
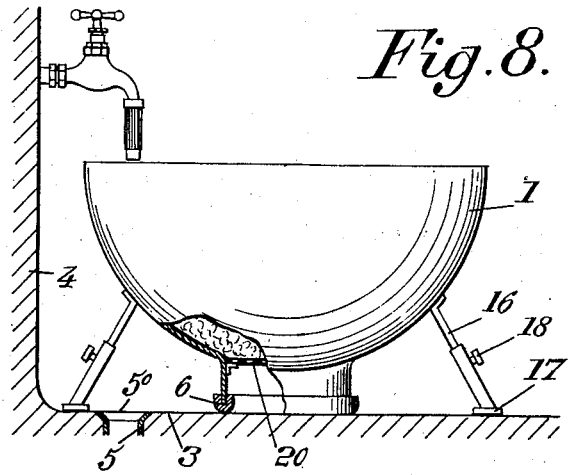

Oct. 6, 1959 R. M. R. G. LOUIS ET AL 2,907,052
RECEPTACLES
Filed July 11, 1957 4 Sheets-Sheet 3

RAYMOND M.R.G. LOUIS
PIERRE CHARLES FOATELLI
INVENTOR
BY Larson and Taylor
ATTORNEY Oct. 6, 1959  R. M. R. G. LOUIS ET AL  2,907,052
RECEPTACLES Filed July 11, 1957  4 Sheets-Sheet 4

RAYMOND M.R.G. LOUIS
PIERRE CHARLES FOATELLI
INVENTOR

BY

ATTORNEY

United States Patent Office 2,907,052
Patented Oct. 6, 1959

2,907,052

RECEPTACLES

Raymond Marie René Georges Louis and Pierre Charles Foatelli, Versailles, France Application July 11, 1957, Serial No. 671,326

Claims priority, application France July 12, 1956

5 Claims. (Cl. 4—187)

The invention relates to portable receptacles to be used for washing, rinsing, straining and similar operations, in particular in enclosures such as scullery sinks.

The object of our invention is to provide an apparatus of this kind which is easier to utilize and to manufacture than those used up to this time.

For this purpose, the apparatus according to our invention comprises a vessel open at the bottom, at least a portion of said vessel having a flared shape toward the top, the vertical axial section of said vessel being so shaped that the vertical cylinder, having as a generatrix the inner periphery of the open bottom end, is located wholly on the inside of said vessel, so that when said vessel is filled the weight of the washing liquid located outside said cylinder will be at least several times the weight of said vessel, at least one screen disposed inside said vessel, and a resilient edge on the open bottom of said vessel which acts as a sealing joint with the surface on which said vessel is resting.

Preferred embodiments of the present invention will be hereinafter described with reference to the accompanying drawings, given merely by way of example and in which:

Fig. 4 similarly illustrates a combination of the same character constructed in accordance with another embodiment of the invention.

Fig. 5 is a diagrammatic vertical section through a receptacle and a stand therefor, again in accordance with an embodiment of the invention.

Figs. 6 and 7 illustrate on a larger scale, and in section, the margin of a receptacle of this character, having sealing means and following two modifications of the invention.

Fig. 8 is a vertical section of a receptacle in accordance with yet another embodiment of the invention.

Fig. 9 is a perspective view of a basket in accordance with the invention for washing and draining salad.

Fig. 10 illustrates a receptacle, and its stand, constructed in accordance with a further embodiment of the invention.

Fig. 11 is a vertical section through a receptacle of plastic material, again in accordance with a modification of the invention.

Figs. 12 and 13 are vertical sections on a larger scale of the wall of a receptacle of this character, but in accordance with two further variants.

Figs. 14 and 15 are vertical sections through a receptacle conforming with two still further embodiments of the invention.

The washing apparatus illustrated by the drawings each include a vessel 1 open at the bottom, including a screen 20 mounted therein and a resilient edge 6 acting as a sealing joint with the surface on which said vessel is resting. Furthermore vessel 1 has a flared shape toward the top such that the vertical cylinder, having as generatrix the periphery of the open bottom end, is located wholly on the inside of said vessel so that when the washing apparatus is filled the weight of the washing liquid located outside said cylinder will be at least several times the weight of said vessel 1.

Owing to this last mentioned feature, when the vessel is filled, the effective weight per unit of supporting surface area is increased, which applies the bottom edges more forcibly against the supporting surface. Vessels of very light weight (for example of aluminium or plastic material, can thus be used successfully.

Figure 1:
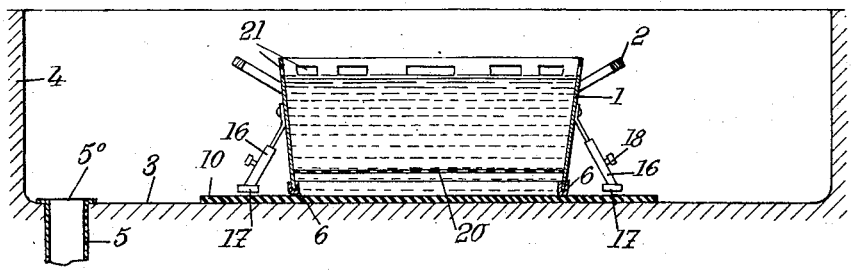
Fig. 1 is a diagrammatic vertical section of the combination of a receptacle and a scullery sink (or other auxiliary receptacle), these conforming with the present invention.

Figure 1 illustrates a vessel 1, assumed to be of rigid material, with handles 2, this receptacle being adapted to have its lower edge resting on the bottom 3 of a sink 4 comprising at least one outlet 5.

This bottom 3 constitutes the bearing surface which is adapted to cooperate with the bottom edge of vessel, and it is preferably plane, horizontal, and smooth, so as to provide for a good sealing contact. It will, however, be understood that in practice, even if these characteristics are not present, the desired result is achieved owing to the provision of the sealing joint 6 mounted on the bottom edge of vessel 1.

It is with this in view that the alternative arrangements such as are illustrated in Figures 6 and 7 may be used. In the first of these (Figure 6) the contact part of the joint 6 is made thinner than the remainder. The other arrangement (Figure 7) provides a part $6_1$ of reduced thickness which, under the influence of the liquid pressure, forms a sealing strip on the inside of the base of the receptacle.

To improve the sealing effect we may, as illustrated in Figure 1, provide on the support surfaces 3 as a sheet 10 of flexible material, for example rubber, sponge rubber, or the like, which is self-adapting to any shape of support, for instance to the stand which will be described later in reference to Figure 4.

This Figure 4 represents a vessel 1 which is supported not on the bottom 3 of the sink but on a stand 11 which has feet 12 (for example three in number) which may be of adjustable height and which are adapted to rest on the bottom. These feet may be provided with resilient anti-shock and anti-slip shoes 13. Several sets of feet of different height may be provided, for example two sets 12, one on either side of the stand 11 which enable this stand to be set at different levels. Moreover, where the stand is covered with a lining or resilient sheet corresponding to that indicated at 10 in Figure 1, two sheets $10_1$, $10_2$ of different resilient characteristics may be provided one on each side of the stand.

In order to guide vessel 1 on the stand, we may provide guide rods 14 co-operating with ears or other devices 15.

Figure 4 also shows screws 39 provided to hold the receptacle 1 in a raised position, on one side at least, to control the escape of the liquid. Abutments or pins $14_1$ may be provided at the top of the rods or arms 14.

Figure 2:
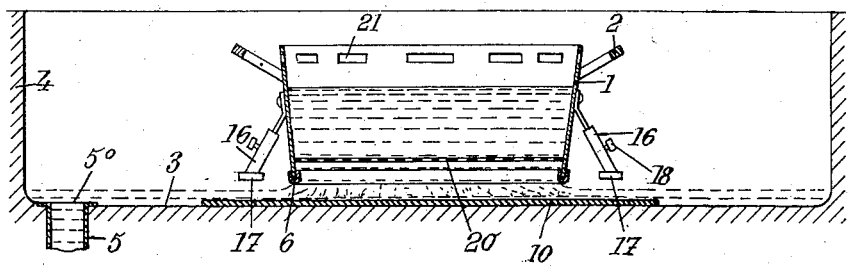
Figs. 2 and 3 are similar drawings respectively illustrating rapid-emptying and slow-emptying positions of the receptacle.
Figure 3:
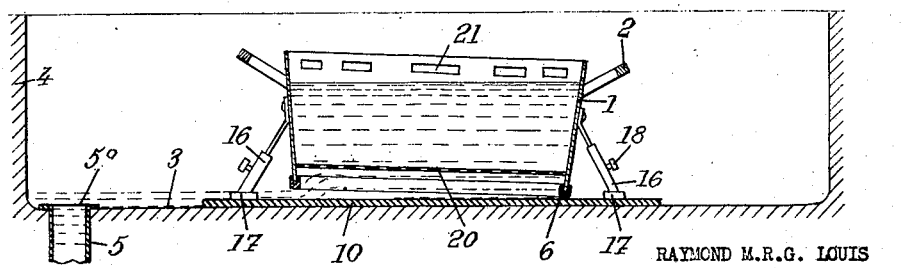

Legs as illustrated at 16 on Figs. 1 to 3 may be mounted on vessel 1. These legs 16, which are advantageously provided at their bottom ends with shoes 17, preferably covered with flexible or resilient material, may be such that they are applied substantially against the same surface as the edge of the bottom opening of the receptacle, the resilient material thereof being compressed at the same time as the joint 6, or serving to reduce the compression of this joint 6, in contact with the supporting surface 3 or 10.

Alternatively they may remain out of contact with the support surface as illustrated by Figure 1, or they may operate in such a way as to maintain the edge of the receptacle bottom opening slightly spaced from the surface 3 or 10 so as to provide a controlled emptying as illustrated by Figure 3. In contrast, Figure 2 indicates rapid emptying by raising the receptacle.

The lengths of legs 16 can be changed as required by means of screws or other devices, for example as diagrammatically illustrated at 18 in Figures 1 to 3.

Means may be provided for producing a temporary fastening, between vessel 1 and the support surface, i.e. the surface 3 in the case of Figure 1, the stand 11 in the case of Figure 4, and so on.

When use is made of a stand with positioning means 14, 15, these latter means may be such as to effect the required locking or fastening. Figure 5 shows another modification using springs 19 for temporarily applying the stand 11 against the bottom edge of the vessel.

In the construction of Fig. 4, screen 20 is of basket-work form.

An advantageous shape of vessel is the bowl form illustrated in Figure 8. This figure shows that the vessel can be placed under a tap with the outlet 5⁰ of the sink not surrounded by the bottom edge of the vessel. The interchangeable grid is seen at 20.

If the goods to be treated are of less density than the liquid as, for example, in the case of salad, overflow openings such as 21 in Figure 1, may be provided in the upper part of the wall of the receptacle so as to prevent floating goods being carried off from the receptacle by overflow. A removable cover may be used for the same purpose, this cover being for example formed by a resilient network which can be compressed into smaller bulk after use, or by arched strips which are articulated to salad baskets as covers.

Figure 9:
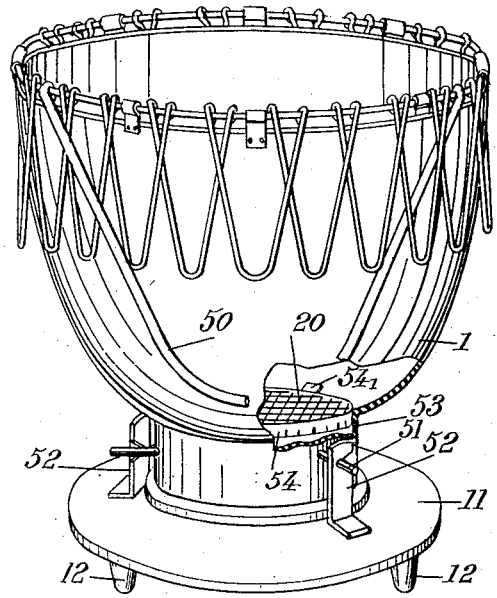

A salad receptacle of this character is illustrated by Figure 9 where the washing handles, of known type, are shown at 50. The structure is of bowl shape. The base is adapted to be fastened to the receptacle by bayonet-joint or other means 51, 52. The lugs 52, which for example are integral with the stand, are adapted to perform the same guiding function for the lower part 53 of the receptacle as the rods 14 of Figure 4. Moreover the bayonet joint fastening enables the sealing linings 6 to be compressed against the stand.

The screen or strainer 20 may be mounted in removable fashion comprising for example a side flange 54 which projects a short distance within the lower wall 53 with a certain amount of friction which keeps the strainer in position when the receptacle is tilted.

Figure 10:
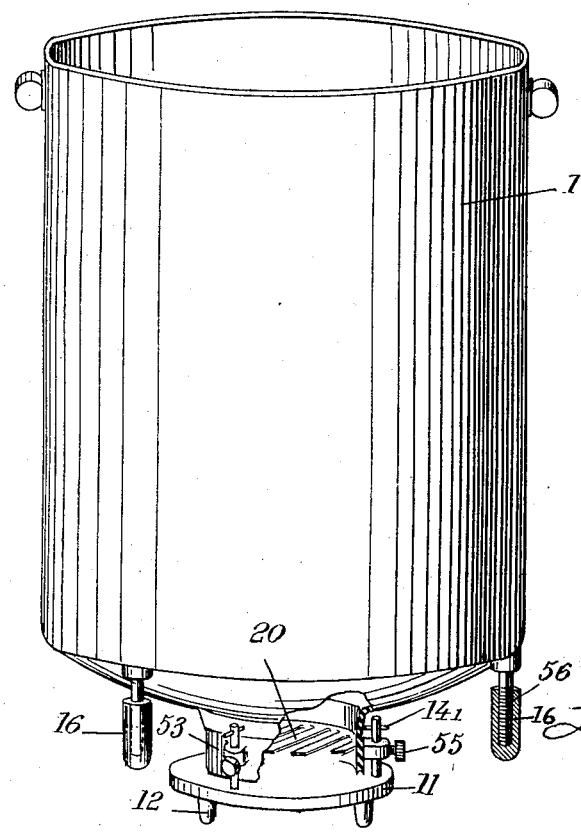

Figure 10 illustrates an apparatus which may advantageously be used for chemical purposes and which may, for example, be made of polyethylene.

Vessel 1, the top part of which is of cylindrical shape, includes a portion 53 of reduced cross section at its bottom end, this portion being adapted to be firmly connected to the stand 11 by clamping screws 55. The vessel is also provided with adjustable legs 16, which are advantageously in the form of internally threaded sleeves co-operating with screw threaded elements 56 rigidly connected to the receptacle. These legs provide for a very precise regulation of the slow-discharge position of the receptacle, when such discharge is required.

Figure 11:
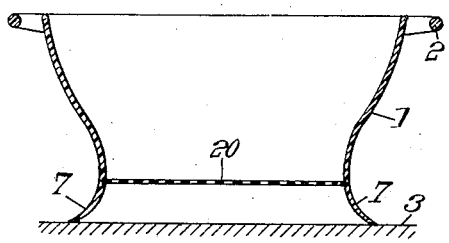
Figures 12, 13:
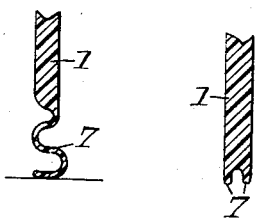

Figures 11 to 13 relate to vessels of plastic material. A difficulty which may occur in this case is that of keeping a good sealing joint along the edge of the bottom opening of the vessel, when said vessel is deformed due to the nature of the material of which it is made.

In many cases it will be of advantage to make the edge portion of the bottom opening of the vessel of a shape which assists in maintaining a sealing effect despite any tendency of the body of the receptacle to become oval in use.

A shape of this kind is indicated in Figure 11, where the bottom edge is flared outwardly and is also reduced in thickness, as indicated at 7.

It is also feasible, where use is made of polyethylene or of a similar material which is less resilient than rubber, to give the margin 7 an accordion form, as illustrated in Figure 12.

Figure 13 illustrates another embodiment in which the lower edge or margin 7 is of U-shape in section, i.e. such as to provide at least two portions of reduced thickness. This construction provides, in effect, a form of suction cup which increases the sealing effect.

Figure 14:
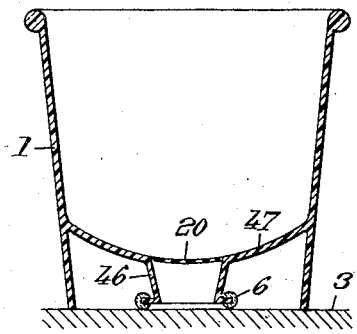

Figure 14 shows another form of vessel, having an opening 46 at its lower part and, above this opening, a sieve 20. This opening, which may be provided with a sealing lining 6, can easily be closed, when required, by a plug inserted therein.

Figure 15:
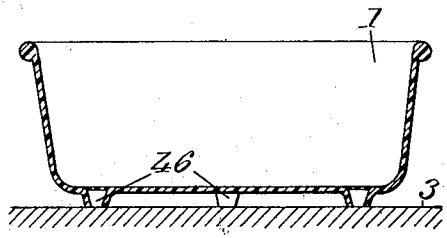

Figure 15 shows a vessel having, for example, three bottom openings provided at the lower ends of supporting legs 46.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A washing apparatus comprising a vessel open at the bottom, at least a portion of said vessel having a flared shape toward the top, the vertical axial section of said vessel being so shaped that the vertical cylinder having as generatrix the periphery of the open bottom end is located wholly on the inside of said vessel, so that when said vessel is filled the weight of the washing liquid located outside said cylinder will be at least several times the weight of said vessel, at least one screen disposed inside said vessel, and a resilient edge on the open bottom of said vessel which acts as a sealing joint with the surface on which said vessel is resting.

2. An apparatus according to claim 1 in which said vessel is relatively rigid, the edge of the open bottom of said vessel including a joint of a resilient material fixed thereon to form said sealing joint.

3. An apparatus according to claim 1 made of a plastic resilient material, the edge of the open bottom of said vessel forming a sealing joint owing to its own resiliency.

4. An apparatus according to claim 1 further including means at the top of said vessel forming a retractable strainer cover thereon.

5. An apparatus according to claim 1 further including removable means for stopping the open bottom of said vessel.

References Cited in the file of this patent
UNITED STATES PATENTS

| | | |
|---|---|---|
| 1,599,835 | Nelson | Sept. 14, 1926 |
| 1,706,771 | Buttner | Mar. 26, 1929 |
| 2,121,719 | Travaglini | June 21, 1938 |
| 2,439,469 | Husted | Apr. 13, 1948 |